(12) United States Patent
Knapper

(10) Patent No.: US 10,698,428 B2
(45) Date of Patent: Jun. 30, 2020

(54) VALVE SUBASSEMBLY WITH LOAD HOLDING IN THE CONTROL SPOOL

(71) Applicant: Robert Bosch GmbH, Stuttgart (DE)

(72) Inventor: Steffen Knapper, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/286,853

(22) Filed: Feb. 27, 2019

(65) Prior Publication Data
US 2019/0302812 A1 Oct. 3, 2019

(30) Foreign Application Priority Data
Mar. 27, 2018 (DE) .................. 10 2018 204 642

(51) Int. Cl.
G05D 7/00 (2006.01)
G05D 16/16 (2006.01)
F15B 13/044 (2006.01)

(52) U.S. Cl.
CPC ......... *G05D 16/166* (2013.01); *F15B 13/044* (2013.01); *Y10T 137/2544* (2015.04)

(58) Field of Classification Search
CPC .................. Y10T 137/2544; Y10T 137/86702
See application file for complete search history.

(56) References Cited

U.S. PATENT DOCUMENTS 3,267,961 A * 8/1966 Rice ...................... F15B 21/047
137/596
3,630,218 A * 12/1971 Parrett ..................... F15B 13/01
137/87.04

6,098,647 A * 8/2000 Haussler ............... F15B 13/015
137/102

(Continued)

FOREIGN PATENT DOCUMENTS

DE 39 11 560 A1 10/1990
DE 10 2013 224 322 A1 5/2015

OTHER PUBLICATIONS

German Search Report corresponding to German Application No. 10 2018 204 642.5, dated Jan. 22, 2019 (German language document) (8 pages).

(Continued)

*Primary Examiner* — Robert K Arundale
(74) *Attorney, Agent, or Firm* — Maginot, Moore & Beck LLP

(57) ABSTRACT

A valve subassembly includes a main spool having a continuously adjustable main orifice and a control spool having adjustable first and second orifices. The control spool has first and second end positions and is acted upon by a first spring toward the first end position. A fluid flow path starts from a pump and runs to an actuator via the first orifice, first control point, second orifice, second control point, main orifice, and third control point. Pressure at the first control point acts on the control spool toward the second end position and pressure at the third control point acts toward the first end position. The second orifice is closed between the first end position and an intermediate position, and opens from the intermediate position to the second end position. The second orifice opening decreases from the intermediate position to the second end position from a nonzero value to zero.

10 Claims, 3 Drawing Sheets

(56) References Cited

U.S. PATENT DOCUMENTS

2015/0101676 A1* 4/2015 Knapper .............. G05D 16/106
                                                            137/102

OTHER PUBLICATIONS

Bosch Rexroth AG: Load-sensing control block in sandwich plate design M4-15. Lohr am Main, Jul. 2016. pp. 1-48. Retrieved Feb. 26, 2019 from: http://www.boschrexroth.com/various/utilieslmediadirectory/download/index.jsp?objecl_nr=RE64283.

* cited by examiner

VALVE SUBASSEMBLY WITH LOAD HOLDING IN THE CONTROL SPOOL

This application claims priority under 35 U.S.C. § 119 to patent application no. DE 10 2018 204 642.5, filed on Mar. 27, 2018 in Germany, the disclosure of which is incorporated herein by reference in its entirety.

The disclosure relates to a valve subassembly.

BACKGROUND

A valve subassembly in the form of a valve plate is known from the catalogue that was available on Mar. 16, 2018 from the following web address http://www.boschrexroth.com/various/utilities/mediadirectory/download/index.jsp?object_nr=RE64283. The valve plate has a main spool with a continuously adjustable main orifice and a control spool with a first and a second orifice and a first spring.

SUMMARY

One advantage of the disclosed valve subassembly is that the valve subassembly has a load-holding function, without this requiring a separate load-holding valve. In spite of this, the pump can be operated in an energy-saving manner with a very low standby pressure. In addition, very long pipelines between the pump and the valve subassembly are not detrimental to the overall system operation. Moreover, in a load scenario in which the system is so heavily loaded that the pump can no longer move the actuator, there is a particularly great hydraulic force at the actuator.

According to the disclosed valve subassembly, the fluid flow path starting from the pump runs to the actuator via the first orifice, on via a first control point, on via the second orifice, on via a second control point, on via the main orifice, on via a third control point, wherein the control spool can be exposed to pressure at the first control point in the direction of the second end position, wherein the control spool is exposed to pressure at the third control point in the direction of the first end position, wherein the second orifice is completely closed between the first end position and an intermediate position, wherein it opens from the intermediate position to the second end position, wherein the opening cross section of the second orifice decreases from the intermediate position to the second end position from a value other than zero to zero.

The main and control spools are preferably each received in a housing in a linearly movable manner, so that the corresponding orifices are adjustable by a linear movement of the respective spool. The valve subassembly is preferably configured in the manner of a valve plate, so that a plurality of valve subassemblies can be assembled into a valve block. All valve subassemblies of the valve block preferably have a joint tank and a joint pump, wherein each valve subassembly is assigned a separate actuator. The actuator is preferably a cylinder or a hydraulic motor. The valve subassembly is preferably operated with a pressure fluid which is most preferably a fluid, for example a hydraulic oil. The opening cross section of the second orifice may reach zero even before the second end position. It preferably decreases continuously in a control range between the intermediate position and the second end position.

A non-return valve may be provided which is inserted between the first and the second control point. In this way, the standby pressure of the pump, in particular, can be minimized.

It may be provided that the non-return valve is inserted parallel to the second orifice. The non-return valve is therefore available as a parallel flow path, particularly when the second orifice is completely closed.

It may be provided that the non-return valve only allows a fluid flow from the first to the second control point. This means that despite the non-return valve, the desired load-holding function is achieved.

It may be provided that the non-return valve is pretensioned into a closed position by a second spring. The required standby pressure of the pump can be set in a defined manner using the second spring.

It may be provided that the non-return valve is arranged inside the control spool. This produces a particularly compact valve subassembly, in particular an especially compact control spool. The disclosed arrangement can, moreover, be made useful in that with a valve subassembly which is not equipped with the load-holding function according to the disclosure, only the control spool is replaced.

It may be provided that the control spool has a sectionally circular-cylindrical base body with a first annular groove which defines both the first and also the second orifice. The base body may exhibit a second annular groove which is arranged between the first annular groove and the first spring. The corresponding control spool has a particularly simple and compact design. At the same time, it allows a high volume flow along the aforementioned fluid flow path. The first annular groove preferably forms the first control point. The second annular groove preferably forms the second control point. The base body may exhibit a third annular groove which is arranged on the side of the first annular groove lying opposite the second annular groove.

It may be provided that the base body has a longitudinal channel running through it along its cylindrical axis, which longitudinal channel is tightly sealed on the side of the first spring with a separate closing body, wherein it is open on the opposite side. The longitudinal channel is therefore particularly easy to produce. The control spool is preferably exposed to pressure at the first control point preferably in the direction of the second end position via the longitudinal channel. The closing body is preferably screwed into the base body. It preferably forms an end stop which defines the second end position.

It may be provided that a valve seat of the non-return valve is arranged in the longitudinal channel, wherein a valve body of the non-return valve is arranged between the closing body and the valve seat. The valve seat is preferably arranged between the first and the second annular groove. At least one first radial bore is preferably arranged in the region of the first annular groove, which radial bore opens out into the longitudinal channel. At least one second radial bore is preferably arranged in the region of the second annular groove, which radial bore opens out into the longitudinal channel. The valve seat is preferably arranged between the at least one first radial bore and the at least one second radial bore. The second spring is preferably arranged between the sealing body and the valve body. The valve body is preferably configured as a sphere.

It may be provided that the longitudinal channel has a constriction in the region of the first annular groove, the diameter of which is between 0.3 mm and 1 mm. The aforementioned diameter is 0.7 mm, for example.

It is evident that the aforementioned features which are still to be explained below can not only be used in the combination indicated in each case, but also in other combinations or alone, without departing from the framework of the present disclosure.

BRIEF DESCRIPTION OF THE DRAWINGS

The disclosure is explained in greater detail below with the help of the attached drawings. In the drawings.

DETAILED DESCRIPTION

Figure 1:
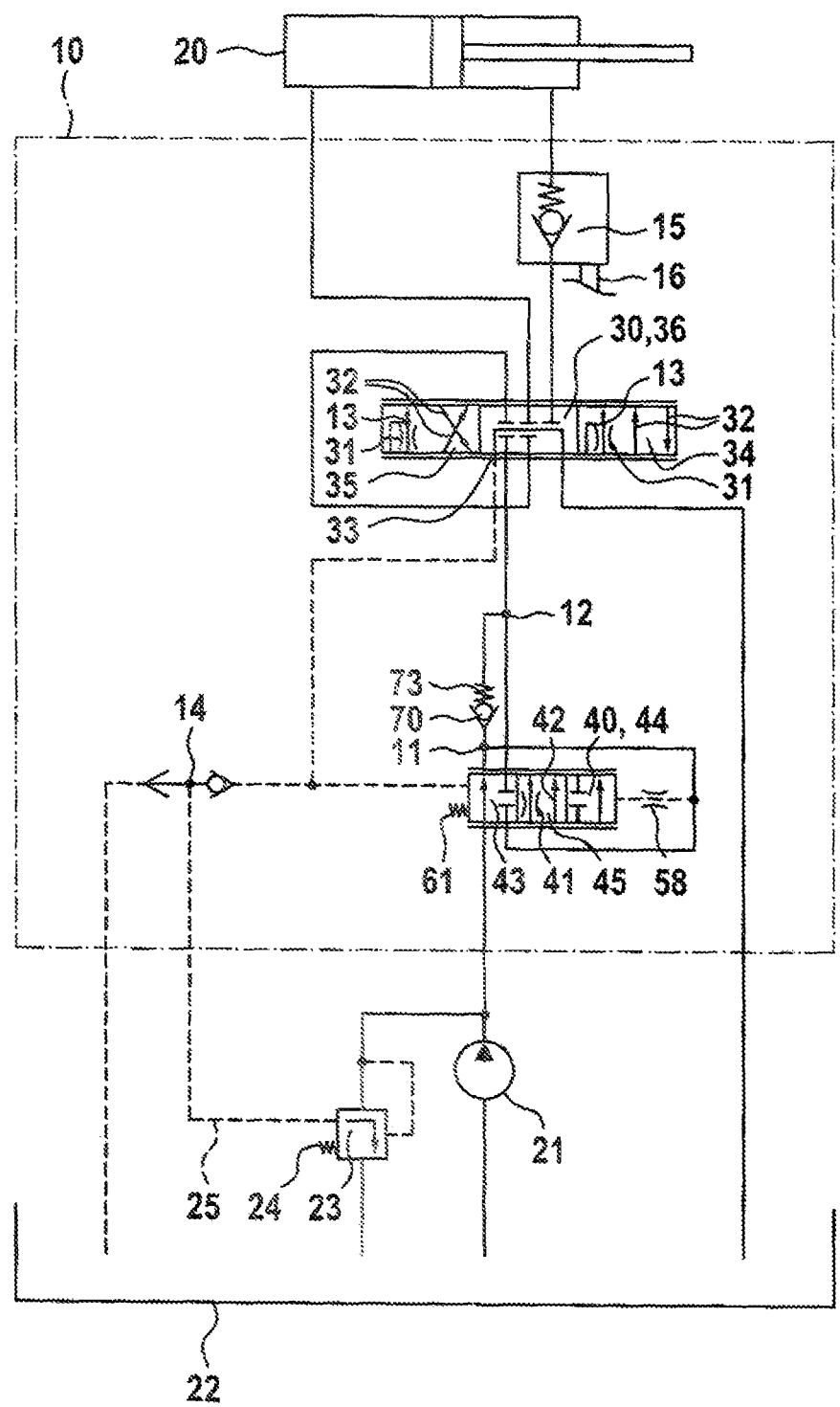
FIG. 1 shows a connection diagram of a valve subassembly according to the disclosure.

FIG. 1 shows a connection diagram of a valve subassembly 10 according to the disclosure. The valve subassembly 10 is attached to a pump 21 which is configured as an external gear pump, for example. The pump 21 draws pressure fluid from a tank 22 and conveys it to the valve subassembly 10, especially to the control spool 40. It is conceivable for a plurality of valve subassemblies 10 to be attached parallel to a pump 21. The pressure fluid is preferably a fluid and most preferably a hydraulic oil. The pump 21 is assigned a pressure maintenance valve 23 with which the conveying pressure of the pump 21 is set, in that a variable part of the conveying flow of the pump 21 is directed straight back to the tank 22. The pressure maintenance valve 23 in this case sets the conveying pressure of the pump 21 in equilibrium with a maximum load pressure 25 and the pretensioning force of a third spring 24.

Each valve subassembly 10 preferably comprises a changeover valve to which the pressure at the third control point 13 can be attached on the input side. Either (as shown) the pressure in the tank 22 or the output pressure of a changeover valve of an adjacent valve subassembly is attached to the other input. If a plurality of valve subassemblies are provided, a cascade of changeover valves 14 therefore results, at which the maximum pressure 25 of the pressures is applied to the third control point 13 at the output. Insofar as there is only one valve subassembly 10, the changeover valve 14 can be dispensed with.

The valve subassembly 10 comprises a main spool 30 with which, in particular, the movement speed and the movement direction of the actuator 20 attached to the valve subassembly 10 is set. The actuator 20 is a cylinder or a hydraulic motor, for example. The main spool 30 defines a continuously adjustable main orifice 31. This is completely closed in a central blocking position 36, wherein it continuously opens toward the first or the second working position 34; 35. The movement speed of the actuator 20 is set using the main orifice 31. A directional control portion 32 at the main spool 30 is inserted downstream of the main orifice 31, with which the movement direction of the actuator 20 is set. In an alternative embodiment of the main spool 30, a separate main orifice is provided for each movement direction which is an integral part of the directional control portion. The installation space requirement is thereby reduced, wherein the load pressure tap 33 is complicated.

The third control pressure 13 downstream of the main orifice 31 is fed out at a separate load pressure tap 33 which is attached to the changeover valve 14. In the blocking position 36 in which the actuator 20 does not move, the pressure in the tank 22 is preferably present at the load pressure tap 33. The pressure at the third control point 13 could also be fed out in the blocking position 36 at the load pressure tap 33; in this way, the energy consumption of the system would be increased, however.

The control spool 40 defines a first and a second orifice 41; 42. A fluid flow path starting from the pump 21 runs to the actuator 20 via the first orifice 41, on via a first control point 11, on via the second orifice 42, on via a second control point 12, on via the main orifice 31, on via a third control point, on via the directional control portion 32. This fluid flow path forms the intake carrying out the hydraulic work for the actuator 20.

The first and second orifice 41; 42 are adjusted jointly when the control spool moves. With the first orifice 41, the drop in pressure at the main orifice 31 is set at a constant value which is defined by the pretensioning force of the first spring 61. The first spring 61 acts on the control spool 40 in the direction of a first end position 43 in which the first orifice 41 is completely open. In the opposite second end position 44, the first orifice 41 is completely closed. Its opening cross section changes therebetween in a monotonic and continuous manner, wherein reference is made to the embodiments in FIG. 3 for further details. In the direction of the first end position 43, the control spool 40 is moreover exposed to pressure at the load pressure tap 33. This is equal to the pressure at the third control point 13, when the actuator 20 moves. If the actuator 20 is not moved, the aforementioned pressure regulation is not necessary. In the direction of the second end position 44, the control spool 40 is exposed to pressure at the first control point 11, namely via a constriction 58 or via a throttle. The constriction 58 means that fluctuations in the conveying pressure of the pump 21 do not have a detrimental effect on a smooth and uniform movement of the actuator 20.

For reasons of cost, the present valve subassembly 10 is only fitted with a single load-holding valve 15. This is preferably active in the movement direction in which an external load has to be supported against gravity on the actuator 20. The load-holding valve 15 is an unlockable non-return valve. Mechanical unlocking is provided in the present case which comprises a tappet 16, wherein hydraulic unlocking mechanisms are also known in the art. The tappet 16 is actuated from an assigned actuation contour on the main spool 30, namely in such a manner that the non-return function of the load-holding valve 15 is active in the blocking position 36 and in the second working position 35, wherein it is not active in the first working position 34. It is achieved by means of the load holding that the actuator 20 is not moved against the desired movement direction if the conveyor pressure of the pump 21 is not sufficient to hold the external load.

The second orifice 42 on the control spool 40 brings about a comparable load holding for the other movement direction. It is effective in both movement directions in this case. Since this load holding is not completely leakage-free, the load-holding valve 15 for a movement direction is provided in addition in the present case.

With this form of load holding, the fact that pressure regulation using the first orifice 41 causes the control spool 40 to move into the first end position 43 when the conveying pressure of the pump 21 is not sufficient is utilized in order to set the pressure drop defined using the first spring 61 at the main orifice 31. The second orifice 42 is completely closed in this position, so that no oil flows along the aforementioned fluid flow path, either in the desired flow direction or in the unwanted opposite flow direction.

The non-return valve 70 is inserted between the first and second control point 11; 12. This is inserted parallel to the second orifice 42, wherein it only allows a fluid flow in the desired direction, so from the first to the second control point 11; 12, but not in the opposite direction.

If the main spool 30 is in the blocking position 36, the pump 21 conveys at a pressure that depends solely on the pretensioning force of the third spring 24. The so-called standby pressure selected should be as low as possible for the purpose of energy saving, since the corresponding fluid flow does not do any useful work. At the same time, however, the selected pressure should be great enough for the aforementioned fluid flow path to actually open when the main spool 30 is moved from the blocking position 36 into the working positions 34; 35. It is conceivable for the opening behaviour of the first and second orifice 41; 42 to be very closely coordinated with one another. In this way, however, excessively large leakages occur at the second orifice 42 when said orifice is to perform its load-holding function. The non-return valve 70 can be used to select the corresponding coordination in such a manner that the aforementioned leakages do not exceed the permitted level. The selected pretensioning force of the second spring 73 can easily be so small that the non-return valve 70 opens even with a very low standby pressure. The volume flow to the actuator 20 following on from this means that the pressure at the third control point 13 increases. Consequently, the maximum load pressure 25 reported at the pressure maintenance valve 23 also rises. This in turn means that the conveying pressure of the pump 21 increases until the second orifice 42 opens.

If a plurality of valve subassemblies is supplied in parallel by a pump 21, the non-return valve 70 is above all intended for the case in which all actuators are at a standstill, wherein a single actuator is to be set in motion.

Figure 2:
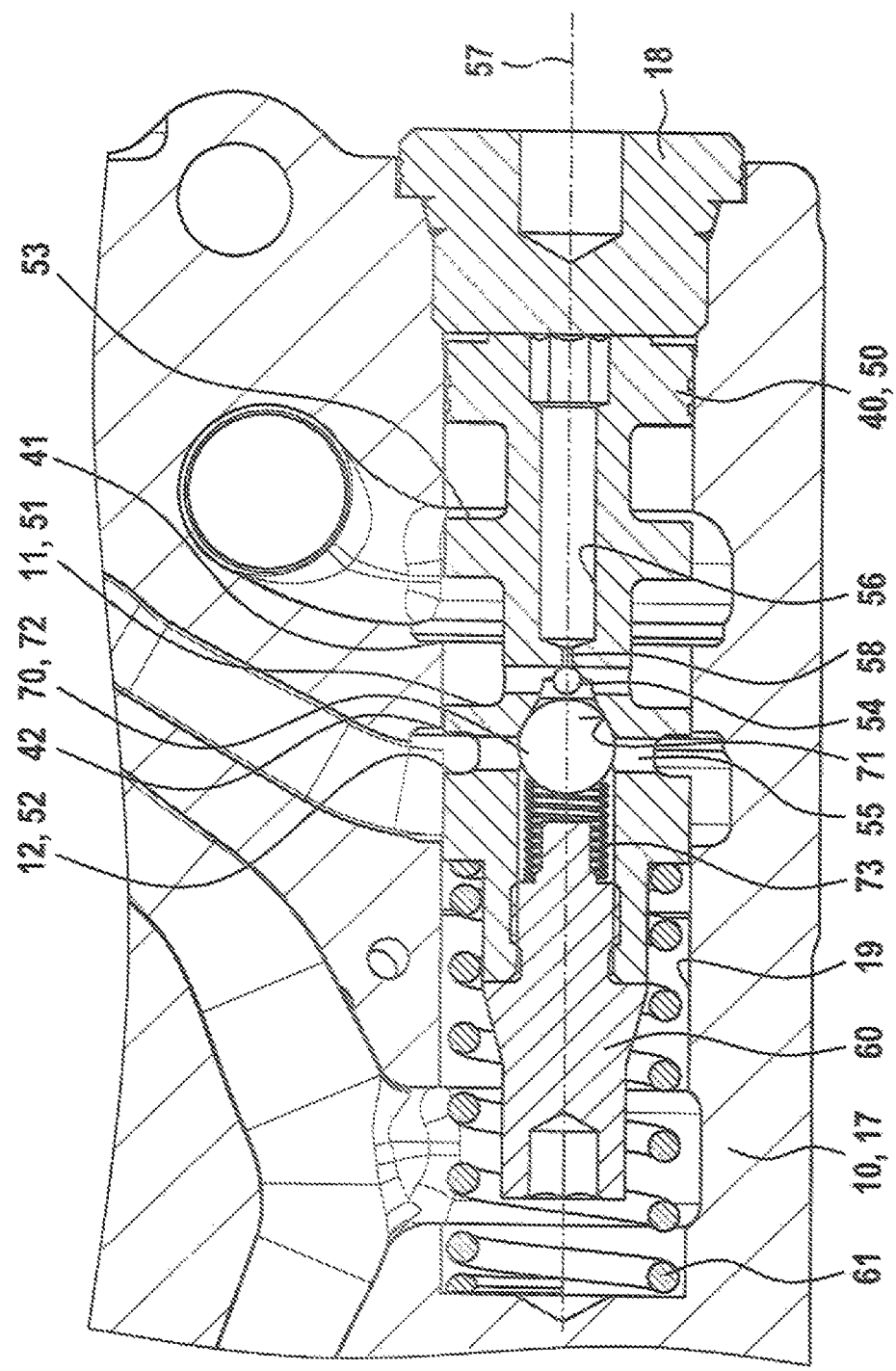
FIG. 2 shows a partial longitudinal section of a valve subassembly according to the disclosure in the region of the control spool.

FIG. 2 shows a partial longitudinal section of a valve subassembly 10 according to the disclosure in the region of the control spool 40. The valve subassembly 10 comprises a housing 17 which is preferably configured in the manner of a valve plate, so that a plurality of valve subassemblies can be assembled into a valve block. A cylindrical bore 19 is provided in the housing 17 in which the control spool 40 is received in a linearly movable manner. Moreover, various channels are provided in the housing 17 which supply the fluid connections explained with reference to FIG. 1. The bore 19 is closed in a fluid-tight manner using a locking screw 18, wherein the locking screw 18 forms an end stop for the control spool 40 which defines the first end position. The control spool is depicted in its first end position in FIG. 2, in which it is pressed by the first spring 61 which is fitted under pretension between the base of the bore 19 and the control spool 40. The first spring 61 is configured as a helical spring which sectionally surrounds a guide extension to the base body 50 of the control spool 40.

The control spool 40 is composed of a base body 50 and a closing body 60. The base body 50 has a circular-cylindrical design in sections, wherein it is so closely adapted to the assigned bore 19 that leaks are minimized as far as possible. A first annular groove 51 is arranged in the centre of the base body 50. The right side wall of the first annular groove in FIG. 2 forms the first orifice 41 along with an assigned control edge on the housing 17. Fine control notches are preferably provided on this side wall, in order to achieve the comparatively smooth opening behaviour of the first orifice 41 depicted in FIG. 3. The left side wall of the first annular groove 51 in FIG. 2 forms the second orifice 42 along with an associated control edge on the housing 17. Preferably no fine control notches are provided there, so that the second orifice 42 opens up a large opening cross section via a short adjustment path.

In the first end position shown, the first orifice 41 is opened very wide, wherein the second orifice 42 is completely closed. The first control point 11 is formed by the first annular groove 51. The pressure there is conducted via a plurality of first radial bores 54 and a longitudinal channel 56 to the right end of the base body 50 in FIG. 2, so that this pressure acts upon the control spool 40 in the direction of the second end position. The constriction 58 that has already been explained is arranged in the corresponding fluid flow path.

The longitudinal channel 56 passes through the base body 50 over its entire length, wherein it is closed in a fluid-tight manner with a separate closing body 60 in the region of the first spring 61. The closing body 60 is preferably screwed into the base body 50. It forms a limit stop along with the base of the bore 19, which limit stop defines the second end position of the control spool 40. The first orifice 41 is completely closed in the second end position, wherein the second orifice 42 is very wide open.

The base body 50 is provided with an optional second annular groove 52 between the first spring 61 and the first annular groove 51. On the base of the second annular groove 52 is arranged a plurality of second radial bores 55 which open out into the longitudinal channel 56. The second annular groove 52 forms the second control point 12. Between the first and the second radial bores 54; 55 the valve seat 71 of the non-return valve 70 is arranged in the longitudinal channel 56. The non-return valve 70 moreover comprises a spherical valve body 72 which is pressed by a prestressed second spring 73 to the valve seat 71. The second spring 73 which is configured as a helical spring is supported by the closing body 60 in this case.

Reference should further be made to the third annular groove 53 which minimizes the weight of the control spool 40, wherein the surface of the control spool 40 resting against the bore 19 is moreover minimized. In this way, a particularly dynamic control behaviour of the control spool 40 results.

Figure 3:
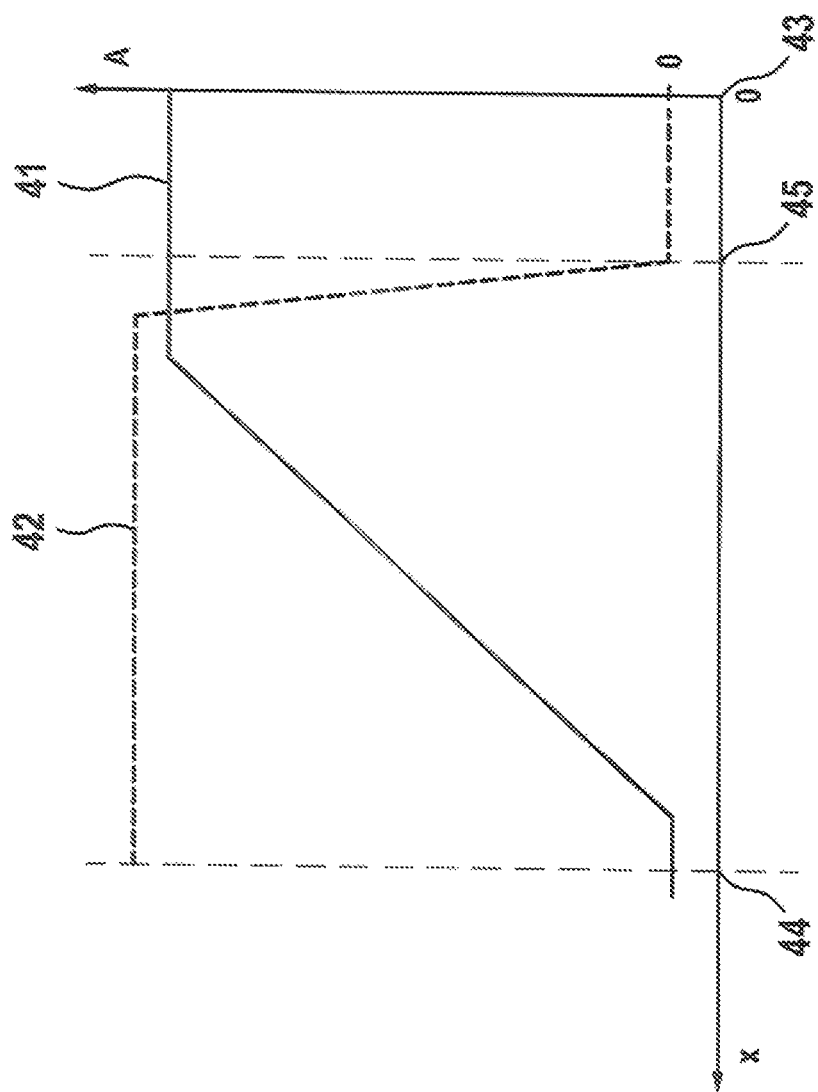
FIG. 3 shows a roughly schematic diagram which depicts the opening cross section of the first and the second orifice via the actuating path of the control spool.

FIG. 3 shows a roughly schematic diagram that depicts the opening cross section A of the first and second orifice 41; 42 over the adjusting path x of the control spool. The opening cross section A is plotted on the vertical axis. The adjusting path x is plotted on the horizontal axis. The zero point disposed on the right in FIG. 3 corresponds to the first end position 43. The second end position 44 is disposed on the left in FIG. 3, so that the movement directions in FIGS. 2 and 3 coincide.

For ease of reference, very large opening cross sections of the first and second orifice 41; 42 which are no longer hydraulically effective because other points in the fluid flow path have a constant, smaller opening cross section are drawn in as horizontal lines.

As has already been explained, the second orifice 42 is completely closed in the first end position 43, wherein the first orifice 41 is very wide open. If the control spool is moved in the direction of the second end position 44, the second orifice 42 remains closed up to the intermediate position 45. The length of this path section determines how great the leakages at the second orifice 42 are when said orifice exerts its load-holding function. Once the intermediate position 45 has passed the second orifice 42 opens very quickly, so that the opening cross section of the first orifice 41 is quickly smaller than the opening cross section of the second orifice 42. It is then substantially only the first orifice 41 that is still hydraulically effective. The opening cross section of said orifice decreases substantially linearly to zero over the remaining path of the control spool to the end position 44. The control spool is typically designed in such a manner that the first orifice 41 is already completely closed just before the second end position 44.

LIST OF REFERENCE NUMBERS

A actual opening cross section
x adjusting path of the control spool
10 valve subassembly
11 first control point
12 second control point
13 third control point
14 changeover valve
15 load-holding valve
16 tappet
17 housing
18 locking screw
19 bore
20 actuator
21 pump
22 tank
23 pressure maintenance valve
24 third spring
25 maximum load pressure
30 main spool
31 main orifice
32 directional control portion
33 load pressure tap
34 first working position
35 second working position
36 blocking position
40 control spool
41 first orifice
42 second orifice
43 first end position
44 second end position
45 intermediate position
50 base body
51 first annular groove
52 second annular groove
53 third annular groove
54 first radial bore
55 second radial bore
56 longitudinal channel
57 cylinder axis
58 constriction
60 closing body
61 first spring
70 non-return valve
71 valve seat
72 valve body
73 second spring

The invention claimed is:

1. A valve subassembly for use with a pump, a tank, and an actuator, the valve subassembly comprising:
    a main spool that defines a continuously adjustable main orifice;
    a control spool that defines a first orifice and a second orifice which are jointly adjustable, the control spool having a first end position and a second opposite end position;
    a first spring acting on the control spool in the direction of the first end position,
    wherein a fluid flow path is defined starting from the pump and running to the actuator via the first orifice, via a first control point, via the second orifice, via a second control point, via the main orifice, and via a third control point,
    wherein the control spool is configured to be exposed to a pressure at the first control point in a second direction toward the second end position,
    wherein the control spool is exposed to a pressure at the third control point in a first direction toward the first end position,
    wherein the second orifice is completely closed between the first end position and an intermediate position, the second orifice opens from the intermediate position to the second end position, and an opening cross section of the second orifice decreases from the intermediate position to the second end position from a nonzero value to zero.

2. The valve subassembly as claimed in claim 1, further comprising:
    a non-return valve arranged between the first and second control points.

3. The valve subassembly as claimed in claim 2, wherein the non-return valve is arranged in parallel relative to the second orifice.

4. The valve subassembly as claimed in claim 2, wherein the non-return valve allows a fluid flow from the first control point to the second control point.

5. The valve subassembly as claimed in claim 2, wherein the non-return valve is biased into a closed position by a second spring.

6. The valve subassembly as claimed in claim 2, wherein the non-return valve is arranged inside the control spool.

7. The valve subassembly as claimed in claim 1, wherein the control spool has a sectionally circular-cylindrical base body with a first annular groove that defines both the first orifice and the second orifice.

8. The valve subassembly as claimed in claim 7, wherein:
    the base body has a longitudinal channel running through the base body along a cylindrical axis of the base body, and
    the longitudinal channel is sealed on a side of the first spring with a separate closing body, and the longitudinal channel is open on the opposite side.

9. The valve subassembly as claimed in claim 8, further comprising:
    a non-return valve arranged between the first and second control points, the non-return valve arranged inside the control spool,
    wherein a valve seat of the non-return valve is arranged in the longitudinal channel, and a valve body of the non-return valve is arranged between the closing body and the valve seat.

10. The valve subassembly as claimed in claim 8, wherein the longitudinal channel has a constriction in a region of the first annular groove, and a diameter of the constriction is between 0.3 mm and 1 mm.

* * * * *